(12) United States Patent
Kavulak et al.

(10) Patent No.: US 7,106,743 B1
(45) Date of Patent: Sep. 12, 2006

(54) TELECOMMUNICATIONS SYSTEM INCLUDING LIVE OPERATORS

(75) Inventors: Paul Harold Kavulak, Omaha, NE (US); Mike Patrick Brown, Omaha, NE (US)

(73) Assignee: West Corporation, Omaha, NE (US)

( * ) Notice: Subject to any disclaimer, the term of this patent is extended or adjusted under 35 U.S.C. 154(b) by 802 days.

(21) Appl. No.: 09/692,575

(22) Filed: Oct. 18, 2000

(51) Int. Cl.
*H04L 12/56* (2006.01)

(52) U.S. Cl. .................... 370/395.1; 370/352; 370/401

(58) Field of Classification Search ................ 370/352, 370/354, 356, 389, 395.1, 401; 379/258, 379/265.01, 265.02, 265.11
See application file for complete search history.

(56) References Cited

U.S. PATENT DOCUMENTS

| | | | |
|---|---|---|---|
| 4,792,968 A | 12/1988 | Katz | |
| 4,956,835 A * | 9/1990 | Grover | 370/228 |
| 5,027,387 A | 6/1991 | Moll | |
| 5,426,634 A | 6/1995 | Cote et al. | |
| 5,586,175 A | 12/1996 | Hogan et al. | |
| 5,594,727 A | 1/1997 | Kolbenson et al. | |
| 5,631,904 A | 5/1997 | Fitser et al. | |
| 5,664,010 A | 9/1997 | Walker et al. | |
| 5,825,858 A | 10/1998 | Shaffer et al. | |
| 5,841,854 A | 11/1998 | Schumacher et al. | |
| 5,883,964 A | 3/1999 | Alleman | |
| 5,923,745 A * | 7/1999 | Hurd | 379/265.02 |
| 5,987,112 A | 11/1999 | Chakravarti et al. | |
| 6,011,844 A | 1/2000 | Uppaluru et al. | |
| 6,014,437 A | 1/2000 | Acker et al. | |
| 6,035,027 A | 3/2000 | Alleman | |
| 6,049,717 A | 4/2000 | Dufour et al. | |
| 6,058,180 A | 5/2000 | Young | |
| 6,081,591 A | 6/2000 | Skoog | |
| 6,085,231 A | 7/2000 | Agraharam et al. | |
| 6,091,810 A | 7/2000 | Shaffer et al. | |
| 6,111,873 A | 8/2000 | Mandalia et al. | |
| 6,115,380 A | 9/2000 | Christie et al. | |
| 6,115,693 A | 9/2000 | McDonough et al. | |
| 6,118,763 A | 9/2000 | Trumbull | |
| 6,118,860 A | 9/2000 | Hillson et al. | |
| 6,118,866 A | 9/2000 | Shtivelman | |
| 6,122,364 A * | 9/2000 | Petrunka et al. | 379/265.02 |
| 6,144,667 A | 11/2000 | Doshi et al. | |
| 6,212,268 B1 | 4/2001 | Nielsen | |
| 6,236,644 B1 | 5/2001 | Shuman et al. | |
| 6,253,249 B1 | 6/2001 | Belzile | |
| 6,307,928 B1 | 10/2001 | Yamasaki | |
| 6,453,034 B1 | 9/2002 | Donovan et al. | |
| 6,512,764 B1 | 1/2003 | Carew et al. | |
| 6,549,229 B1 | 4/2003 | Kirby et al. | |

(Continued)

OTHER PUBLICATIONS

McAllister et al. "Merging Voice Communications and Information Processing: Using a Platform for Voice Information Services". IEEE. Mar. 1990. p. 882.*
Schoen et al. "Convergence Between Public Switching and the Internet". IEEE. Jan. 1998. pp. 50-65.*

(Continued)

*Primary Examiner*—Derrick Ferris (57) ABSTRACT

Apparatus and methods are provided for effecting telephonic communication. In one aspect of the invention, a telecommunications system includes a hub location including a call center front end, one or more remote locations each including a call center back end, and a connectivity member for connecting the hub location to the one or more remote locations. In the preferred embodiment, the one or more remote locations are preferably geographically separate from the hub location, such as in different parts of the country, or in different countries, and the connectivity member preferably includes an asynchronous transfer mode (ATM) based transport network.

22 Claims, 4 Drawing Sheets

U.S. PATENT DOCUMENTS

| | | |
|---|---|---|
| 6,594,257 B1 | 7/2003 | Doshi et al. |
| 6,693,661 B1 | 2/2004 | Vanderwilt et al. |
| 2001/0002927 A1 | 6/2001 | Detampel et al. |
| 2003/0026406 A1 | 2/2003 | Ernstrom et al. |
| 2003/0103468 A1 | 6/2003 | Seavers et al. |
| 2003/0185362 A1 | 10/2003 | Kim |
| 2004/0062210 A1 | 4/2004 | Genter et al. |

OTHER PUBLICATIONS

McDysan et al. "ATM Theory and Application", McGraw Hill, Inc. Copyright 1995. pp. 305-306.*

Stratton, Nathan. LATA Map. Copyright 1999. http://www.robotics.net/clec/LATA_Map.html.*

U.S. Patent Office Recognizes New Multifunction Telecommunications Technology, Business Wire, Inc., Jun. 6, 1989.

* cited by examiner

TELECOMMUNICATIONS SYSTEM INCLUDING LIVE OPERATORS

FIELD OF THE INVENTION

Methods and apparatus are provided for effecting telephonic communication. More specifically, the inventions relate to methods and apparatus for providing inbound telephonic call centers.

BACKGROUND OF THE INVENTION

Telephone call processing and switching systems of many types are known in the art. Such systems are used in telemarketing operations, telephone-based information systems, financial and insurance service operations, and public service centers, to name but a few examples. Automated or semi-automated call centers are examples of such systems, including functional features such as automatic call distributors (ACD), interactive voice response (IVR or VRU) systems, and coordinated voice and data delivery.

For example, telemarketing is a well-known form of remote commerce, that is, commerce wherein the person making the sale or taking the sales data is not in the actual physical presence of the potential purchaser or customer. In general operation, a prospective purchaser typically calls a toll-free telephone number, such as an 800 number. The number dialed is determined by the carrier as being associated with the telemarketer, and the call is delivered to the telemarketer's call center. A typical call center will have a front end with one or more VRU units, call switching equipment, an ACD, and several work stations having a telephone and computer terminal at which a live operator processes the call. The dialed number, typically taken automatically from the carrier (long distance) through use of the dialed number identification service (DNIS), is utilized to effect a database access resulting in a "screen pop" of a script on the operator's computer terminal, utilizing a computer telephone integration (CTI) network. In this way, when a prospective purchaser calls a given telephone number, a telemarketing operator may immediately respond with a script keyed to the goods or services offered. The response may be at various levels of specificity, ranging from a proffer of a single product, e.g., a particular audio recording, or may be for various categories of goods or services, e.g., where the dialed number is responded to on behalf of an entire supplier. Typically, the prospective purchaser is responding to an advertisement or other solicitation, such as a mail order catalog or the like, from which the telephone number is obtained.

The use of telephonic systems to effect commercial transactions is now well known. For example, in Katz U.S. Pat. No. 4,792,968, filed Feb. 24, 1987, and issued Dec. 20, 1988, entitled "Statistical Analysis System for Use With Public Communication Facility", an interactive telephone system for merchandising is disclosed. In one aspect of the disclosure, a caller may interact with an interactive voice response (IVR or VRU) system to effectuate a commercial transaction. For example, the caller may be prompted to identify themselves, such as through entry of a customer number as it may appear on a mail order catalog. In an interactive manner, the caller may be prompted to enter an item number for purchase, utilizing an item number designation from the catalog or otherwise interact with the system to identify the good or service desired. Provision is made for user entry of payment information, such as the entry of a credit card number and type identifier, e.g., VISA, American Express, etc. Options are provided for voice recording of certain information, such as name, address, etc., which is recorded for later processing, or in certain modes of operation, connecting the customer to a live operator for assistance.

More recent applications for electronic commerce are described in Katz PCT Publication No. WO94/21084, entitled "Interactive System for Telephone and Video Communication Including Capabilities for Remote Monitoring", published Sep. 15, 1994. In certain aspects, the application provides systems and methods for conduct of electronic commerce over communication networks, such as through the accessing of such resources via an on-line computer service, wherein the commercial transaction may be effected including some or all of dynamic video, audio and text data. Optionally, the system contemplates the interchange of electronic commerce commercial data, e.g., electronic data interchange (EDI) data, where on-line computer services are used by at least certain of the potential purchasers to interface the system, such as is used to access the Internet.

One example of a telecommunications system is a call center. While not conceded to be prior art, one embodiment of a call center system is shown in U.S. Pat. No. 6,011,844 to Uppaluru et al. Toll-free calls are intercepted at or near their points of origin by a point-of-presence (POP) call center gateway, and connected to a business call center just as an operator picks up a proxy call initiated at the business call center. To be effective, the system requires a large number of the described POP call center gateways. The system is also limited to 800 number calls reliant upon the Service Management Systeem/800 (SMS/800) routing capability, and it does not eliminate the need to have a fully equipped business call center in communication with the POP call center gateways.

One disadvantage of the call centers known to the art is the capital expense involved in setting up and maintaining such call centers. Call centers typically require multiple VRU units, call switches, automatic call distributors, agent workstations, and the like. This equipment is relatively expensive to purchase and maintain. A further disadvantage of the known call centers is their underuse. A typical call center will have periods of time of peak use, and other periods of underuse. As a result, staffing of the call center is a challenge, and much of the equipment is left unused or underused for extended periods of time.

Asynchronous Transfer Mode (ATM) is a broadband technology that has been applied to telecommunications systems in certain limited applications. For example, while again not conceded to be prior art, in U.S. Pat. No. 6,115,380 to Christie et al., a system is disclosed for providing virtual connections through an ATM interworking multiplexer on a call-by-call basis. The patent does not describe, however, methods or apparatus for applying ATM technology and capabilities to a telecommunications system on a large scale, such as may be required for a telemarketing call center or systems requiring higher call volume.

SUMMARY OF THE INVENTION

Apparatus and methods are provided for effecting telephonic communications, such as in inbound telemarketing, electronic commerce, or telephone-based information services, which are particularly adapted for use in a telecommunications call center environment. The apparatus and methods are preferably scalable, providing the ability to accommodate systems having a small number of calls to those having a very large call volume.

In one aspect, a method for providing a telecommunications system includes providing a communications system hub, providing a communications system back end at a location different from the system hub, and communicatively connecting the system hub to the system back end. In a preferred embodiment, the communications system hub is provided with equipment, features, and functionality to serve as a call center front end, performing functions such as receiving incoming calls, performing automated call processing, switching, and routing functions, and delivering the incoming calls to a connectivity member for transmission of the calls to the communications system back end. In the preferred embodiment, the communications system back end is provided with equipment, features, and functionality to serve as a call center back end, performing functions such as receiving calls from the connectivity member, processing, switching and routing the calls to live operator work stations, and providing services responsive to the calls by live operators.

In another aspect, a telecommunications system includes a hub location including a call center front end, one or more remote locations each including a call center back end, and a connectivity member for connecting the hub location to the one or more remote locations. In this implementation, the one or more remote locations are preferably geographically separate from the hub location, such as in different parts of the country, or in different countries, and the connectivity member preferably includes an asynchronous transfer mode (ATM) based transport network.

In the preferred embodiment, the hub location has, for example, one or more voice response units (VRUs) for initially processing a call received from a carrier, one or more switches for routing or otherwise processing the call, and one or more ATM switches providing the capability for having call signals to be carried by an ATM connectivity member. Each remote location preferably has, for example, an ATM switch for receiving the call and re-converting the signal from ATM, one or more automatic call distributors (ACDs) for processing and distributing the call to a live operator, and one or more live operator workstations for receiving and processing the call. Each remote location is connected to the hub location, preferably by an ATM connectivity member such as a network of connection lines and ATM switches provided by a vendor such as AT&T, Sprint, or other ATM capable long distance services provider.

In another aspect, a telecommunications system is provided having the ability to accommodate incoming calls carried by any call carrier, such as AT&T, Sprint, MCI, or others. Further, the telecommunications system is able to accommodate any type of incoming calls, including, for example, toll calls, local exchange carrier (LEC) calls, long distance calls, 800 number calls, 900 number calls, 700 number calls, or others.

Several advantages are obtained by providing the one or more remote locations at a geographic distance from the hub. For example, a single hub may be designed to have sufficient capacity to support several remote locations located in several time zones. In this way, the peak hours of operation for the one or more remote locations may be staggered, so that the hub may be used at a relatively constant and consistently higher level than it would be if used for only a single, co-located call center back end. In other words, while any given remote location may be minimal or no use, the hub may be utilized at a relatively higher level by one or more of the other remote locations, thereby making the call center more efficient. This advantage is further enhanced in the event that remote locations are found in different time zones.

Another advantage obtained by having the one or more remote locations supported by a single hub is that the remote locations may be placed in geographic areas having a more readily available workforce to satisfy the call center live operator staffing needs. The remote location may be constructed, for example, in a city having a relatively untapped workforce, without having the need to include the hub-based equipment and functionality at the remote site.

A still further advantage obtained by having one or more remote locations supported by a single hub is that the capital cost of constructing a remote location is lower than it would be if the remote location were to include the front end equipment provided in the hub. As a result, the hub may be constructed to have a capacity sufficient to accommodate several remote locations, or it may be more easily expanded when necessary, while remote locations may be added as needed at lower cost than would otherwise be necessary and with greater speed than would otherwise be possible. Similarly, capacity at both the hub and the remote locations may be increased more easily than would be possible if the hub equipment and remote location equipment were necessarily co-located.

A still further advantage is that maintenance of the equipment is centralized at the hub, and reduced at each remote location, and equipment maintenance is therefore more efficient. In particular, the provision of all VRU units at a central hub allows more efficient maintenance of those units than would be available if each remote location included VRU units and other front end call center equipment. On the other hand, the fact that the front end call center equipment is not maintained at the remote locations means that there is less maintenance required in those locations.

The hub and the remote locations may include additional, or fewer, features and functionality than those described above for the preferred embodiment while still obtaining the benefits of having the hub and remote locations at different sites. For example, if additional functionality such as advanced speech recognition is preferred to be included in the initial call processing function performed by the VRU units in the preferred embodiment, that functionality may be added to the hub and be available to each of the remote locations. Alternatively, one or more of the features or functionality described for the hub in the preferred embodiment may be bypassed or not provided at all if not needed for a given telecommunications system. The inventions described herein are not limited to the specific embodiments described, or to the specific equipment, features, or functionality described for the hub and remote locations of the examples contained herein. These examples are provided to illustrate, but not to limit the inventions described herein.

It is an object of this invention to provide improved telecommunications systems and methods.

It is yet a further object of this invention to provide telecommunications systems and methods that improve the efficient use and decrease underuse of the equipment contained in automated portions of a call center.

It is yet a further object of this invention to provide telecommunications systems and methods that improve the flexibility and options for staffing exemplary implementations, such as call centers.

It is yet a further object of this invention to provide telecommunications systems and methods that provide improved efficiencies in constructing, expanding, and maintaining implementations such as call centers.

DETAILED DESCRIPTION OF THE INVENTION

Figure 1:
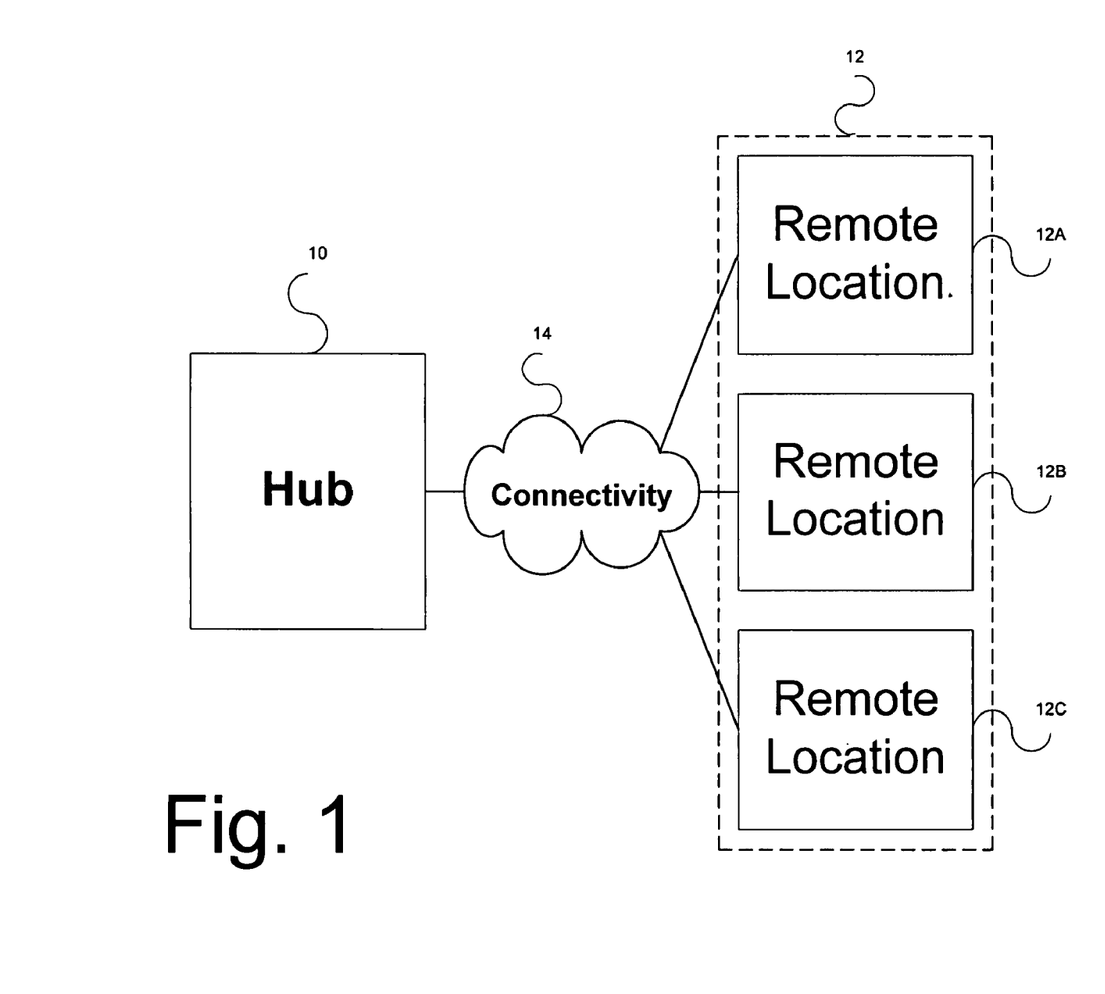
FIG. 1 is a simplified block diagram demonstrating aspects of a telecommunications system.

FIG. 1 shows a hybrid block diagram and flowchart of one implementation of the system and methods of these inventions. The simplified depiction of FIG. 1 reflects aspects of an inbound call center implementation, though it will be understood that the various structures and functionalities may be extended to other implementations, such as electronic commerce, telephone based information services, and the like. The telecommunications system of the invention will include a central hub 10, one or more remote locations 12A, 12B, 12C, and a connectivity member 14 providing telecommunications connectivity between the hub and the one or more remote locations. The example depicted in FIG. 1 includes three remote locations 12A, 12B, 12C, though it is understood that more or fewer remote locations are possible.

The hub 10 serves as the initial contact point for the telecommunications system with an incoming call. The hub 10 will preferably contain equipment, features, and functionality to perform many of the initial call processing and routing functions desired to be included in the telecommunications system. For example, in the preferred embodiment described below, the hub serves as a call center front end, providing initial call processing, and routing calls to the appropriate remote location.

The remote locations 12A, 12B, 12C serve as destination points for incoming calls to the telecommunications system. The remote locations will each preferably contain equipment, features, and functionality to perform many or all of the call processing functions not able to be performed by the hub. For example, in the preferred embodiment described below, each remote location serves as a call center back end, providing call receiving, call distribution, and live operator functions to the telecommunications system.

The connectivity member 14 provides telecommunications connectivity between the hub and each of the remote locations. Those of ordinary skill in the art will recognize that this function may be performed by many different implementations, including T1 trunk lines, wide area networks (WAN), voice over IP (VoIP) networks, software defined networks (SDN), the public switched telephone network (PSTN), asynchronous transfer mode (ATM) networks, or wireless communications networks, to name but a few examples. In addition, telecommunications connectivity is a rapidly developing field, and future technologies may provide alternative implementations suitable for providing the functionality required of the described connectivity member.

Figure 2:
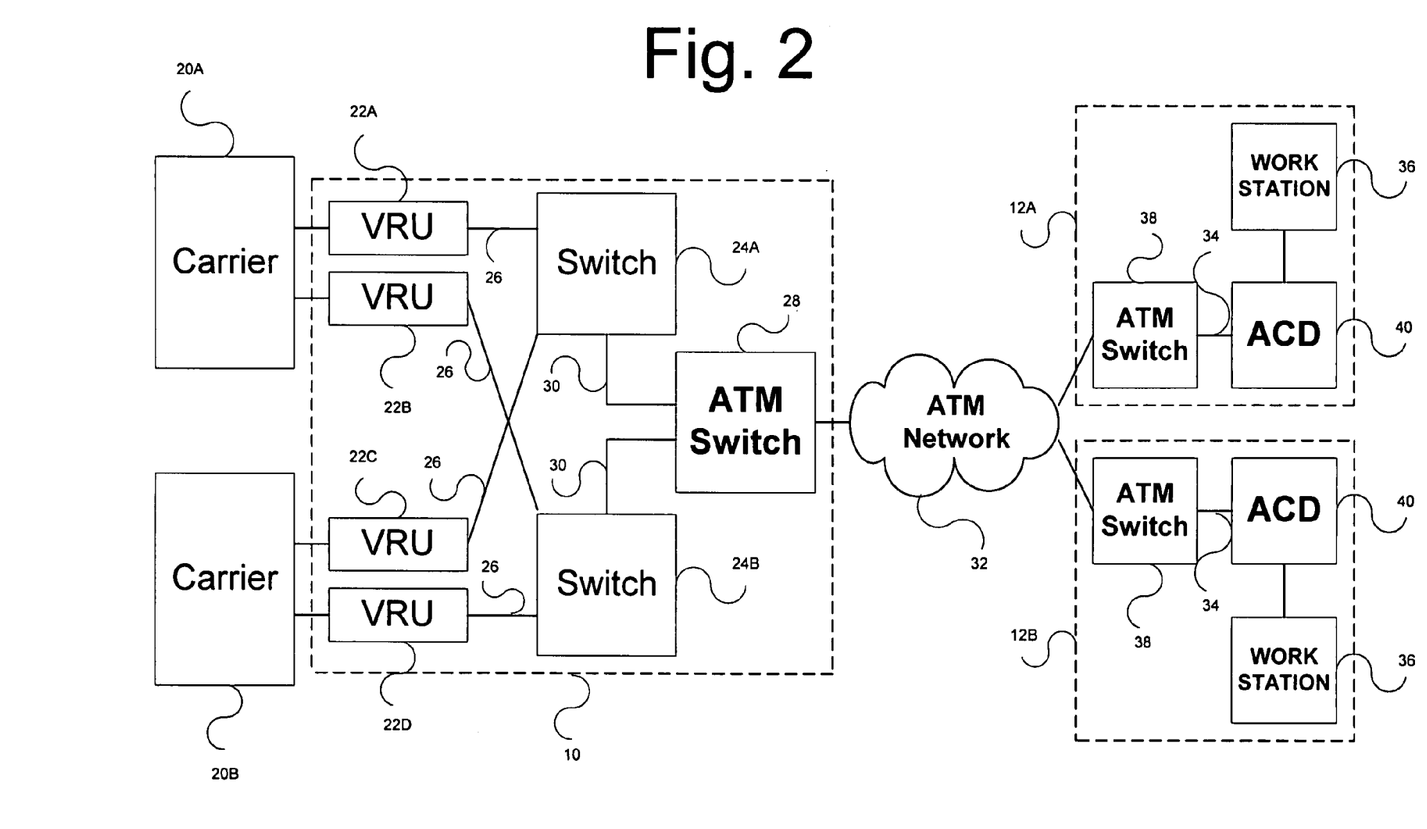
FIG. 2 is a simplified block diagram showing a call center implementation of the described telecommunications system.

FIG. 2 shows a hybrid block diagram and flowchart of a preferred embodiment of the telecommunications system in the form of a call center. Although the example described below will frequently refer to a singular call, it should be understood that a call center will typically handle a relatively high volume of incoming calls, and that the single call example is for illustration. In this embodiment, a call is delivered to a hub 10 by a carrier 20, which may be AT&T, Sprint, MCI, or any telephone services carrier. As an example, two such carriers 20A, 20B are shown in FIG. 2. The call is initially received and processed by a voice response unit (VRU) 22 of which there may be one or more provided at the hub. Four VRU units, 22A–22D, are represented graphically in the example in FIG. 1. Voice response units are known in the art, and the details of the operation of the VRU will not be explained here. Briefly, the VRU is a telecommunications computer, also called an Interactive Voice Response (IVR) unit, that responds to caller entered touch-tone digits and/or to the caller's voice in much the same way that a conventional computer responds to keystrokes or mouse clicks. The VRU plays digitally recorded speech that provides menu selections to the caller. The caller then enters the touch-tone digits that correspond to the desired menu selection or provides a voice response. The caller entered digits or voice commands can invoke options as varied as looking up account balances, moving the call within or to another system component, obtaining preliminary information from a caller, or playing a pre-recorded announcement for the caller. In a typical call center, the function of the VRU is to obtain preliminary call information, such as the caller's identity, customer information, preliminary transaction data, or the like.

When the call is delivered by the carrier, the dialed number is available through the carrier's Dialed Number Information Service (DNIS), and the calling telephone number is available by use of Automatic Number Identification (ANI). Automated or semi-automated intelligent call processing is made available by either or both of the ANI or DNIS provided by the carrier. In the preferred embodiment, the DNIS for each call is used to route the call. More particularly, after the call is processed at the VRU 22, the VRU 22 creates a connection to a switch 24, as described below, and connects the incoming call to the switch 24. As part of the process, the VRU assigns an internal DNIS that associates the call with its destination at the proper remote location. The internal DNIS associated with the call by the VRU is used by the system to route the call to its proper destination.

After the call has been processed at the VRU 22A–D, it is connected to the programmable switch 24. Each VRU is connected to one or more switches by, for example, T1 voice trunk lines 26. In the preferred embodiment, the switch 24 is a Summa Four Model VCO/4K open, programmable switch available from Cisco Systems, Inc. The switch 24 allows the system to switch or otherwise process calls based upon any programmable criteria. It is desirable to have the flexibility and functionality that can be provided by the programmable switch, particularly in call centers having a high level of call volume. The switch 24 enables scalability of the telecommunications system, and flexibility in building additional features or functionality into the system as desired.

Although two switches 24A, 24B are illustrated in FIG. 2, the system may include more or fewer switches. Advantages to providing more switches include increased volume capability and increased protection in the event of a failure of one of the switches. The same is true of the VRU units 22A–22D illustrated in the Figures. The amount of system component redundancy will be a function of cost and risk acceptance. The number of VRU units and switches shown in the Figures, and the interconnections or lack of interconnections between them, are for illustrative purposes only, and are not intended to be limiting.

The switch 24 next routes the call to an ATM switch 28 by way of, for example, T1 voice trunk lines 30. In the preferred embodiment, the ATM switch 28 is a Passport 6480 multiservice switch manufactured by Nortel Networks. The ATM switch 28 provides a connection from the hub 10 to the connectivity member for transmission of the call to the proper remote location.

In the preferred embodiment, the connectivity member is an ATM network 32 providing asynchronous transfer mode (ATM) connectivity between the hub 10 and the remote locations 12A, 12B. ATM is a signal transmission standard in which information such as voice, video, or data is conveyed in small, fixed-size cells. It is a technology that provides scalable bandwidth from a few megabits per second (Mbps) to many gigabits per second (Gbps). ATM provides several advantages that make it particularly suited for use in the present telecommunications system, including scalable bandwidths at preferable price and performance points. ATM also provides Quality of Service (QOS) guarantees that are beneficial to the performance of, for example, a call center. The ATM Switch 28 provides a secure connection between the hub 10 and an ATM-based connectivity member such as the ATM Network 32.

It is advantageous to compress the call voice signal prior to transmission into the ATM network 32. Standard, non-compressed services may be replaced with voice signal services compressed at ratios of up to 12:1 while maintaining toll-quality signals. In the preferred embodiment, the call signal is compressed in an 8:1 ratio, i.e., a conventional 64 kbps pulse code modulation (PCM) signal is compressed to 8 kbps, to decrease the bandwidth demand for the ATM Network. One voice compression technology suitable for use in the present call center system the so-called conjugate structure algebraic code excited linear prediction model (CS-ACELP), capable of compressing voice at the 8:1 ratio while maintaining the toll quality call standard. The details of the voice compression technology are beyond the scope of the present invention, and will not be discussed in detail here. Voice signal compression in the preferred embodiment is obtained by including a digital signal processor (DSP) provided by Nortel Networks in the ATM Switch 28.

Once the call signal is compressed and converted to ATM at the ATM Switch 28, it is carried by the ATM Network 32 to its proper destination. The ATM switch 28 uses the internal DNIS associated with the call to route the call to its proper remote location 12, based upon previously defined software control.

The ATM Network 32 comprises any network providing ATM transmission connectivity between the call center hub and the one or more remote locations. The ATM Network 32 may be a single transmission line connecting the hub to a co-located remote location, a major carrier's national or international network of ATM switches and transmission lines connecting the hub to a remote location situated in another city, state, or foreign country, or something in between. In the preferred embodiment, the ATM Network 32 is a national network of ATM switches and transmission lines provided by a vendor such as AT&T for connecting a hub located in a different area of the country from, for example, one of the remote locations. The details of the ATM Network are not important to the function of the described call center, and will therefore not be addressed further here.

The ATM Network 32 delivers the call to the remote location 12 to which the call is routed by the ATM switch 28 at the hub 10. Two such remote locations 12A, 12B are shown in FIG. 2. In the preferred embodiment, each remote location 12 is the back-end of a call center, where live operators are available to receive and process inbound calls. Each live operator preferably works at a workstation 36 equipped with a telephone or other call-receiving equipment, as well as a computer connected to a database containing the call center service information.

The remote location interface with the ATM Network is another ATM switch 38 similar or identical to that provided at the hub. The ATM switch 38 re-converts the signal from ATM transmission to, for example, time division multiplexing (TDM) transmission over conventional T1 voice trunk lines 34, and transfers the call to an Automatic Call Distributor (ACD) 40. The ACD 40 is controlled to provide call routing based upon, for example, the availability of operators located at the remote site or other call-routing decision criteria. Once the call is routed to and received by the operator at the operator workstation 36, the call is processed in a manner known to those skilled in the art.

It is preferred that the calls be carried in the integrated systems digital network (ISDN) format. ISDN is an international standard for telephone transmission. The primary rate interface (PRI) ISDN interface provides higher speed bandwidth than either traditional analog or comparably priced switched digital services. Each of twenty-three bearer (B) channels, which carries subscriber voice and/or data, and one D channel, which carries signaling and control information, provides 64 Kbits/second of bandwidth. For the bandwidth delivered, an ISDN line is significantly less expensive than a private leased line that supplies the same bandwidth across the three channels. Furthermore, ISDN, being a digital end-to-end service, provides digital transmission channels that tend to be more accurate and reliable, from the standpoint of error rates and dropped connections, than are conventional analog connections. This accuracy and reliability may be important in, for example, a call center environment. Finally, ISDN provides signaling that works on a "look ahead" basis that will detect network malfunctions before a call is actually routed and encounters a failure of some type. Accordingly, with ISDN, a backup transmission method may be selected upon failure detection. Internet protocol (IP or TCP/IP) is an alternative format, and others are known to those of ordinary skill in the art, but ISDN is included in the preferred embodiment.

Figure 3:
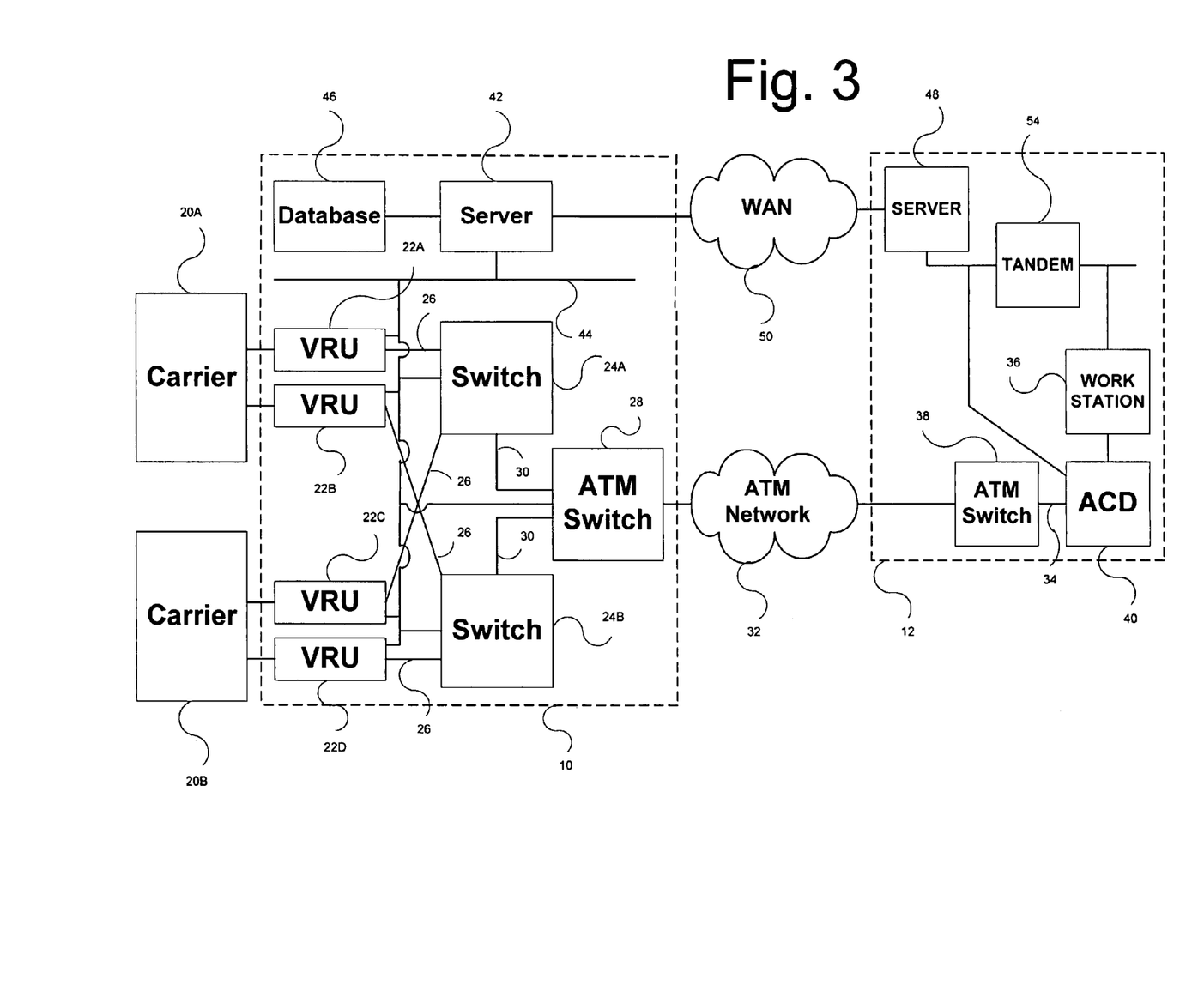
FIG. 3 is a simplified block diagram of the system of FIG. 2 demonstrating an example of a systems management and applications feature.

In FIG. 3, the telecommunications system is shown having an exemplary server-based systems management and applications function such as, for example, computer telephone integration (CTI) functions. Only a single remote location 12 is shown in FIG. 3, it being understood that other remote locations may be within the system, as discussed elsewhere. Further, it should be understood that systems management and applications may be incorporated into the telecommunications system in many different ways, or not at all, with the system shown in FIG. 3 being but one example. The server environment may be utilized on an as needed basis, and is not critical to the overall functionality of components of the telecommunications system described above. For example, a CTI environment may provide additional functionality based upon information obtained by the VRU units during call processing which may be communicated to the live operator at the remote location work station.

In the example, a server 42 is provided at the hub 10 and is connected to each of the VRU units 22A–D and to each switch 24A, 24B over, for example, a local area network 44.

The server 42 is preferably provided with a systems management software module to provide general systems control over the VRU units and switches. The server 42 may also be provided with any applications software modules needed to support the features and functions of the hub 10, including, for example, information used by the VRU units to interface with incoming calls. These applications software modules may utilize information obtained from databases maintained on the server, or from an external database 46, as shown in FIG. 3.

The external database 46 may be maintained at the hub 10 location, as shown in FIG. 3, or it may be off-site, such as at one of the remote locations 12 or at the business location of a third party providing information to be used in the system for processing incoming calls. Those skilled in the art will recognize that various forms of connectivity may be used to provide communications between the server 42 and the database 46, such as the local area network 44 within the hub 10, another LAN or WAN, or other communications network.

In the preferred embodiment, the hub server 42 is connected to a remote site server 48 over, for example, a wide area network (WAN) 50. Alternatively, the hub server 42 may be connected to the remote location server 48 over another public or private network. As another alternative, the hub server 42 may be connected to the remote location server 48 over the same network used to connect the hub 10 to the remote locations 12, which, in the preferred embodiment, is the ATM Network 32.

The hub server 42 and remote location server 48 cooperate to provide data communication in parallel with the voice communication carried through other portions of the telecommunications system. A remote location local area network (LAN) 52 supports communication between the remote location server 48, the remote location ACD 40, a tandem switch 54, and the computer terminal provided at the work station 36. In this way, as the call is delivered to the work station 36, a screen pop associated with the call is caused to occur at the terminal of the work station computer. The operator is then able to process the call.

Figure 4:
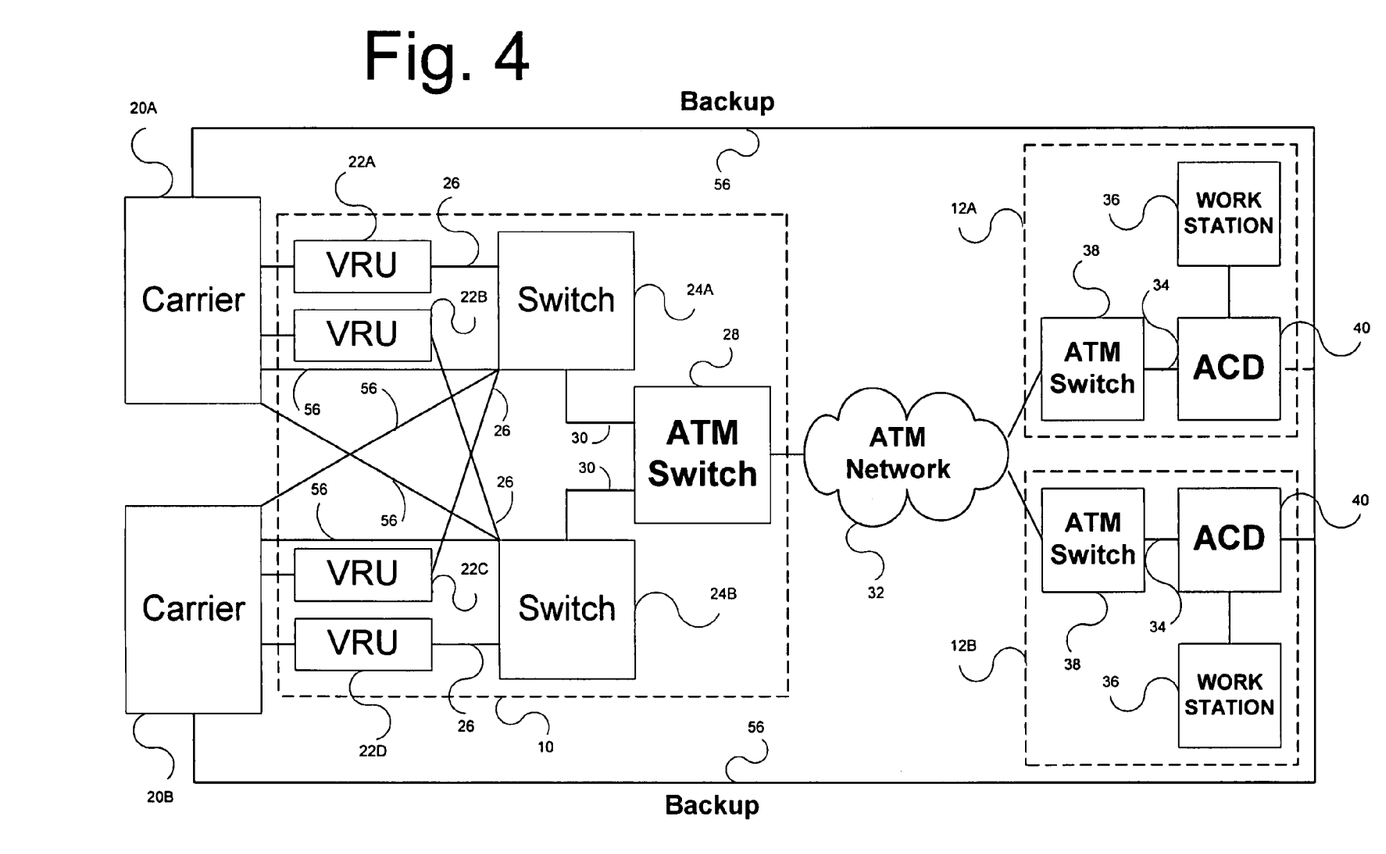
FIG. 4 is a simplified block diagram of the system of FIG. 2 demonstrating a system backup feature.

In FIG. 4, the telecommunications system is shown having a backup network 56 that is provided as protection to the call center system in the event of failure of any of the system components. For example, if the ATM Network 32 becomes unavailable at any time, the backup network 56 may be used to bypass the ATM Network 32 and direct calls to the proper remote location 12. In such a case, the hub switch 24, rather than routing the call through the ATM switch 28 at the hub, will route the call back through the carrier's network to the ACD 40 at the appropriate remote location 12. The backup network 56 may comprise, for example, software defined network (SDN) services available from a long distance carrier such as AT&T, Sprint, or MCI, a separate voice over IP (VoIP) network, PSTN, or any other suitable telecommunications system. In the event of a system failure, the hub switch 24 may be programmed to route the call to the appropriate remote location based upon the dialed number DNIS. In this way, the backup network 56 is transparent to a user of the system, who will be connected to the proper remote location, and the call is processed just as if it was received and processed through the hub as discussed above.

The foregoing cited references, patents and publications are hereby incorporated herein by reference, as if fully set forth herein. Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

We claim:

1. A telecommunications system adapted to perform as a geographically-distributed call receiving center for an inbound telemarketing campaign while minimizing capital expenditures associated with constructing the telecommunications system, enhancing utilization levels of the call receiving center, the telecommunications system comprising at least the following:

a single, centralized hub having at least one voice response unit (VRU) for initially receiving and processing incoming telephone calls, a server coupled to the VRU unit, a programmable switch, and at least a first Asynchronous Transfer Mode (ATM) switch adapted to transfer ones of said calls for routing to a remote location corresponding to the number dialed for said calls, wherein the programmable switch is coupled to the VRU and to the first ATM switch;

a plurality of remote sites distributed to respective locations that are geographically remote from the hub, each site having a respective second ATM switch adapted to receive ones of the calls as transferred from the first ATM switch, at least one telephone receiver to enable live operators at the sites to receive the transferred calls from the second ATM switch, and at least one server coupled at least to the second ATM switch, wherein a respective parameter representing a peak hours of operation is associated with each one of the remote sites, wherein the respective parameters associated with corresponding ones of the remote sites are staggered relative to one another, wherein all of said calls are received by the hub and routed to given ones of the remote sites based on the parameter, thereby utilizing the hub more efficiently over time, and wherein capital assets located at the respective sites are minimized in favor of maximizing the capital assets located at the hub;

a first connectivity member coupled to provide voice communications between the hub and the sites so that the hub has a one-to-many relationship with the sites;

a second connectivity member coupled to provide data communications between the hub and the sites, the server at the hub coupled to communicate with each of the servers at the sites via the second connectivity member; and at least a third connectivity member coupled to provide a redundant voice communications link between the hub and the sites in the event that the first connectivity member fails;

wherein the incoming telephone calls received and processed at the VRU are each assigned an internal Dialed Number Information Service (DNIS) that associates each of the calls with their proper remote sites;

wherein the first ATM switch uses the internal DNIS associated with each of the calls to route the calls to their proper remote sites; and wherein the programmable switch is programmed to route each of the calls to their proper remote sites in an event of a system failure, based upon the internal DNIS associated with each of the calls.

2. The telecommunications system of claim 1, wherein the connectivity member comprises a telecommunications network.

3. The telecommunications system of claim 2, wherein the telecommunications network supports asynchronous transfer mode (ATM) communication.

4. The telecommunications system of claim 3, wherein the telecommunications network comprises a plurality of ATM transmission lines and ATM switches.

5. The telecommunications system of claim 1, wherein the hub is a call center front end having voice response functionality.

6. The telecommunications system of claim 5, wherein the call center front end includes at least one voice response unit (VRU).

7. The telecommunications system of claim 1, wherein the first switch supports asynchronous transfer mode (ATM) switching.

8. The telecommunications system of claim 1, wherein the first switch supports frame relay switching.

9. The telecommunications system of claim 1, wherein the remote sites are provided in a plurality of respective physical locations, at least some of the physical locations being different from that of the hub.

10. The telecommunications system of claim 9, wherein the hub and at least one of the remote sites are separated by a distance of ten feet or more.

11. The telecommunications system of claim 9, wherein the hub and at least one of the remote sites are separated by a distance of one mile or more.

12. The telecommunications system of claim 9, wherein the hub and remote sites are both located in the United States, and wherein the hub is located in a different state of the United States than that of at least one of the remote sites.

13. The telecommunications system of claim 1, wherein the remote sites are implemented as call center back ends, with each remote site having at least one live operator.

14. The telecommunications system of claim 13, wherein the call center back ends further comprise an automatic call distributor (ACD).

15. The telecommunications system of claim 1, wherein at least one of the second switches supports asynchronous transfer mode (ATM) switching.

16. The telecommunications system of claim 1, wherein at least one of the second switches supports frame relay switching.

17. The telecommunications system of claim 1, wherein the hub includes a first server having computer telephone integration (CTI) capability.

18. The telecommunications system of claim 17, wherein the remote site includes a second server in communicative contact with the first server.

19. The telecommunications system of claim 18, wherein the first server and second server are connected by a telecommunications network.

20. The telecommunications system of claim 19, wherein the telecommunications network is the connectivity member.

21. The telecommunications system of claim 1, further comprising a backup network providing telecommunications connectivity between the hub and at least one of the remote sites.

22. The telecommunications system of claim 21, wherein the backup network is a software defined network (SDN) provided by a telephone services carrier.

* * * * *